(12) United States Patent
Mazzarese et al.

(10) Patent No.: US 12,101,807 B2
(45) Date of Patent: Sep. 24, 2024

(54) CHANNEL ACCESS METHOD AND APPARATUS FOR TRANSMISSION OF A SIGNAL IN UNLICENSED SPECTRUM

(71) Applicant: Huawei Technologies Co., Ltd., Shenzhen (CN)

(72) Inventors: David Jean-Marie Mazzarese, Beijing (CN); Jiayin Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 370 days.

(21) Appl. No.: 17/563,678

(22) Filed: Dec. 28, 2021

(65) Prior Publication Data

US 2022/0124801 A1 Apr. 21, 2022

Related U.S. Application Data

(63) Continuation of application No. PCT/CN2019/093966, filed on Jun. 29, 2019.

(51) Int. Cl.
*H04W 74/0808* (2024.01)
*H04L 5/00* (2006.01)

(52) U.S. Cl.
CPC ....... *H04W 74/0808* (2013.01); *H04L 5/0048* (2013.01)

(58) Field of Classification Search
CPC .......... H04W 74/0808; H04W 16/14; H04L 5/0048; H04L 5/0032; H04L 5/001; H04L 5/0016; H04L 5/006; H04L 5/0071; H04L 27/2601; H04L 5/0082; H04L 27/0006
See application file for complete search history.

(56) References Cited

U.S. PATENT DOCUMENTS

2018/0115981 A1* 4/2018 Kim .................. H04W 72/1215
2018/0175975 A1* 6/2018 Um .......................... H04L 1/18
(Continued)

FOREIGN PATENT DOCUMENTS

| CN | 101252510 A | 8/2008 |
| CN | 105050190 A | 11/2015 |
| WO | 2019023586 A1 | 1/2019 |

OTHER PUBLICATIONS

Huawei et al., "Coexistence and channel access for NR unlicensed band operations", 3GPP TSG RAN WG1 Meeting #92bis, R1-1803679, Sanya, China, Apr. 16-20, 2018, 7 pages.
(Continued)

*Primary Examiner* — Dady Chery
(74) *Attorney, Agent, or Firm* — Slater Matsil, LLP (57) ABSTRACT

Embodiments of the present invention provides a method and an apparatus for channel access for the transmission of a signal. The method includes: counting down, by a first device, an initial value N of a random backoff counter within a contention window; sensing, by the first device, a channel status; determining, by the first device, whether or not to perform transmission of the signal within a periodic window based on the sensed channel status; transmitting, by the first device, the signal after sensing the channel to be idle. Therefore, the channel access method and apparatus adapt to the data and control traffic load in the channel using LBT with random back-off with a contention window of variable size.

19 Claims, 7 Drawing Sheets

(56) References Cited

U.S. PATENT DOCUMENTS

2018/0249484 A1* 8/2018 Kim .................. H04W 74/0808
2018/0302927 A1* 10/2018 Noh ........................ H04L 27/26

OTHER PUBLICATIONS

3rd Generation Partnership Project; Technical Specification Group Radio Access Network; Study on NR-based Access to Unlicensed Spectrum (Release 16), 3GPP TR 38.889 V0.3.0 (Nov. 2018), 109 pages.

IEEE Std 802.11, IEEE Standard for Information technology—Telecommunications and information exchange between systems Local and metropolitan area networks—Specific requirements, Part 11: Wireless LAN Medium Access Control (MAC) and Physical Layer (PHY) Specifications, approved Dec. 7, 2016, 3534 pages.

3rd Generation Partnership Project; Technical Specification Group Radio Access Network; Physical layer procedures for shared spectrum channel access (Release 15), 3GPP TS 37.213 V15.2.0 (Mar. 2019), 20 pages.

3rd Generation Partnership Project; Technical Specification Group Radio Access Network; Study on Licensed-Assisted Access to Unlicensed Spectrum (Release 13), 3GPP TR 36.889 V13.0.0 (Jun. 2015), 285 pages.

Wi Rapporteur (Ericsson, Huawei), "RAN1 Agreements and Working Assumptions for Rel-13 LAA", 3GPP TSG RAN WG1 Meeting #82bis, R1-156379, Malmo, Sweden, Oct. 5-9, 2015, 9 pages.

3rd Generation Partnership Project; Technical Specification Group Radio Access Network; Study on NR-based access to unlicensed spectrum (Release 16), 3GPP TR 38.889 V16.0.0 (Dec. 2018), 119 pages.

Samsung, "DRS design and LBT procedure", 3GPP TSG RAN WG1 Meeting #82, R1-154767, Beijing, China, Aug. 24-28, 2015, 7 pages.

ETSI, 5 GHz RLAN; Harmonised Standard covering the essential requirements of article 3.2 of Directive 2014/53/EU, ETSI EN 301 893 V2.1.1 (May 2017), 122 pages.

ETSI, LTE; Physical layer procedures for shared spectrum channel access (3GPP TS 37.213 version 15.1.0 Release 15), ETSI TS 137 213 V15.1.0 (Oct. 2018), 22 pages.

* cited by examiner

CHANNEL ACCESS METHOD AND APPARATUS FOR TRANSMISSION OF A SIGNAL IN UNLICENSED SPECTRUM

CROSS-REFERENCE TO RELATED APPLICATIONS

This application is a continuation of International Application No. PCT/CN2019/093966, filed on Jun. 29, 2019, the disclosure of which is hereby incorporated by reference in its entirety.

TECHNICAL FIELD

This application relates to the field of communications technologies, and specifically, to a channel access method and an apparatus for transmission of a signal in unlicensed spectrum.

BACKGROUND

The technology of long term evolution-licensed assisted access (LTE-LAA) was introduced by the technology of carrier aggregation (CA), which can aggregate a component carrier in licensed spectrum with a component carrier in 5 GHz unlicensed spectrum. A transmission of data and control information of uplink and downlink in unlicensed spectrum is assisted by licensed spectrum where signals used for initial access are transmitted in licensed spectrum.

The technology of NR unlicensed (NR-U) is an extension of LTE-LAA, with the additional support of standalone operation using only unlicensed spectrum. In this case, signals used for initial access are transmitted in unlicensed spectrum.

The communication system using LAA or NR-U performs a mechanism of listen before talk (LBT). The transmission of signals is allowed to be performed when a channel is sensed to be idle. Based on the above, it is objective of the present invention to determine how to design a channel access method for transmission of signals in unlicensed spectrum to adapt to the data and control traffic load.

SUMMARY

Embodiments of the present invention provide a channel access method and an apparatus for transmission of a signal in unlicensed spectrum, to adapt to the data and control traffic load in the channel using LBT with random back-off with a contention window of variable size.

According to an aspect, an embodiment of the present invention provides a channel access method for transmission of a signal in unlicensed spectrum. The method includes: counting down, by a first device, an initial value N of a random backoff counter within a contention window; sensing, by the first device, a channel status; determining, by the first device, whether or not to perform transmission of the signal within a periodic window based on the sensed channel status; transmitting, by the first device, the signal after sensing the channel to be idle; wherein a value of the counter is decreased by 1 when the channel is sensed to be idle in one sensing slot; wherein determining is performed one or multiple times in one or multiple sensing time units within one periodic window after the value of the counter has reached 0 and before the value of counter is re-initialized; wherein transmitting the signal occurs within the periodic window after sensing the channel to be idle after the counter has reached 0.

In a possible design, the determining, by the first device, whether or not to perform the transmission of the signal within the periodic window based on the sensed channel status, comprising: when the channel is sensed idle during a first sensing time unit, the first device performs the transmission of the signal; wherein the first sensing time unit occurs before a transmission occasion within the periodic window, and the periodic window contains multiple transmission occasions.

In a possible design, when the first device performs the transmission at a transmission occasion within the periodic window, the first device adjusts a contention window size (CWS) to the smallest size after an end of the transmission.

In a possible design, the adjusting the CWS comprises: adjusting the CWS to the smallest size; doubling the CWS; or keeping the CWS when the CWS is the largest.

In a possible design, the determining, by the first device, whether or not to perform transmission of the signal within the periodic window based on the sensed channel status, comprising: when the channel is sensed occupied during a first sensing time unit, the first device senses the channel during a second sensing time unit, wherein the second time unit are within the periodic window.

Optionally, the second sensing time unit is smaller than the first sensing time unit.

In a possible design, when the channel is sensed occupied in every sensing time unit used for determining whether or not to perform transmission of the signal within the periodic window, the first device does not transmit the signal during the periodic window and the first device increases a contention window size (CWS) before the value of counter is re-initialized.

In a possible design, the first device adjusts a contention window size (CWS) after an end of the transmission or an end of the periodic window. Wherein the adjusting the CWS comprises: increasing the CWS; or keeping the CWS when the CWS is the largest.

In a possible design, when the channel is sensed idle during the second sensing time unit after the counter has reached 0, the first device performs the transmission of the signal; wherein the first sensing time unit and the second sensing time units occurs before a transmission occasion within the periodic window, and the periodic window contains multiple transmission occasions.

Optionally, the signal is a discovery reference signal (DRS).

Optionally, the periodic window is discovery signals measurement timing configuration (DMTC) window.

In a possible design, the first device is a network device or a terminal device.

According to another aspect, an embodiment of the present invention provides a channel access apparatus for transmission of a signal, comprising: a processing unit, configured to count down an initial value N of a random backoff counter within a contention window; a receiving unit, configured to sense a channel status; the processing unit further configured to determine whether or not to perform transmission of the signal within a periodic window based on the sensed channel status; a sending unit configured to transmit the signal after sensing the channel to be idle; wherein a value of the counter is decreased by 1 when the channel is sensed to be idle in one sensing slot; wherein the processing unit is performed one or multiple times in one or multiple sensing time units within one periodic window after the value of the counter has reached 0 and before the value of counter is re-initialized; wherein transmitting the signal occurs within the periodic window after sensing the channel to be idle after the counter has reached 0.

In a possible design, when the channel is sensed idle during a first sensing time unit, the sending unit performs the transmission of the signal; wherein the first sensing time unit occurs before a transmission occasion within the periodic window, and the periodic window contains multiple transmission occasions.

In a possible design, when the sending unit performs the transmission at a transmission occasion within the periodic window, the processing unit further configured to adjust a contention window size (CWS) to the smallest size after an end of the transmission.

In a possible design, when the sending unit performs the transmission not at a start time within the periodic window, the processing unit further configured to adjust a contention window size (CWS) after an end of the transmission. Wherein the adjusting the CWS comprises: adjusting the CWS to the smallest size; doubling the CWS; or keeping the CWS when the CWS is the largest.

In a possible design, when the channel is sensed occupied during a first sensing time unit, the processing unit configured to sense the channel during a second sensing time unit, wherein the second sensing time unit are within the periodic window. Wherein the second sensing time unit is smaller than the first sensing time unit.

In a possible design, the processing unit further configured to adjust a contention window size (CWS) after an end of the transmission or an end of the periodic window. Wherein the adjusting the CWS comprises: increasing the CWS; or keeping the CWS when the CWS is the largest.

In a possible design, when the value N of the counter reaches 0 before a first time within the periodic window, the processing unit configured to perform the transmission at the first time, and adjust a contention window size (CWS) to the smallest size after an end of the transmission.

In a possible design, when the channel is sensed occupied in every sensing time unit used for determining whether or not to perform transmission of the signal within the periodic window, the sending unit does not transmit the signal during the periodic window and the processing unit further configured to increase a contention window size (CWS) before the value of counter is re-initialized.

In a possible design, when the channel is sensed idle during the second sensing time unit after the counter has reached 0, the sending unit configured to perform the transmission of the signal; wherein the first sensing time unit and the second sensing time units occurs before a transmission occasion within the periodic window, and the periodic window contains multiple transmission occasions.

Optionally, the signal is a discovery reference signal (DRS).

Optionally, the periodic window is discovery signals measurement timing configuration (DMTC) window.

In a possible design, the apparatus is a network device or a terminal device.

In a possible design, the apparatus may implement, by using hardware, the function performed by the apparatus in the foregoing method. A structure of the apparatus may include a processor and a transceiver. The processor can implement a function of the processing unit. The transceiver can implement a function of the receiving unit and the sending unit.

In a possible design, the apparatus may implement, by using hardware executing corresponding software, the function performed by the apparatus in the foregoing method. The hardware or software includes one or more modules corresponding to the foregoing function. The modules may be software and/or hardware.

According to still another aspect, an embodiment of the present invention provides a communications device, comprising: a memory, configured to store a computer program; and a processor, configured to execute the computer program stored in the memory, so that the communication device performs the method according to foregoing aspects.

According to yet another aspect, an embodiment of the present invention provides a computer readable storage medium, comprising an instruction, wherein when being run on a computer, the instruction enables the computer to perform the method according to foregoing aspects.

Based on the technical solutions provided in the embodiments of the present invention, the access to the channel within a periodic window (e.g. DMTC window) is conditioned on the successful completion of a contention window counter before being allowed to attempt one or multiple discontinuous single-shot LBTs within the DMTC window before transmission. Therefore, this adapts to the data and control traffic load in the channel using LBT with random back-off with a contention window of variable size.

BRIEF DESCRIPTION OF THE DRAWINGS

To describe the technical solutions in the embodiments of the present invention, the following briefly introduces the accompanying drawings required for describing the embodiments.

The following describes technical solutions in embodiments of the present invention with reference to accompanying drawings.

Figure 1:
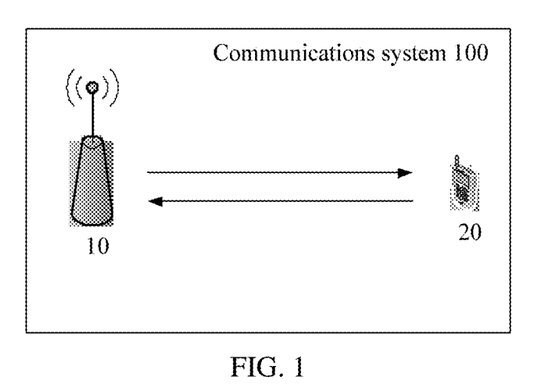
FIG. 1 is a schematic diagram of a communications system according to an embodiment of the present invention.

The technical solutions provided in the embodiments of the present invention are based on a communications system 100 shown in FIG. 1. The communications system 100 can support a URLLC service having a relatively high latency requirement. It may be understood that the communications system 100 also supports a data service having a conventional latency requirement such as an enhanced mobile broadband (eMBB) service. The communications system 100 includes at least one network device and at least one terminal device. As shown in FIG. 1, the communications system 100, for example, includes a network device 10 and a terminal device 20. The network device 10 may send control information and service data to the terminal device 20, and may receive control information and service data sent by the terminal device 20.

It should be understood that in this embodiment of the present invention, the communications system 100 may be a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), and other wireless communications systems using an orthogonal frequency division multiplexing (OFDM) technology. In addition, the communications system 100 may be further applied to a 5G communications technology. The system architecture and the service scenario described in the embodiments of the present invention are intended to describe the technical solutions in the embodiments of the present invention more clearly, and do not constitute a limitation on the technical solutions provided in the embodiments of the present invention. A person of ordinary skill in the art may know that: With the evolution of the network architecture and the emergence of new service scenarios, the technical solutions provided in the embodiments of the present invention are also applicable to similar technical problems.

In this embodiment of the present invention, the terminal device may also be referred to as user equipment (UE), a mobile station (MS), a mobile terminal, or the like. The terminal device may communicate with one or more core networks through a radio access network (RAN). For example, the terminal device may be a mobile phone (or referred to as a "cellular" phone), a computer having a mobile terminal, or the like. For example, the terminal device may further be a portable, pocket-sized, handheld, computer built-in, or in-vehicle mobile apparatus. These apparatuses exchange voice and/or data with the radio access network.

In this embodiment of the present invention, the network device may also be referred to as an access network device. For example, the network device may be a base transceiver station (BTS) in GSM or CDMA, may be a NodeB (NB) in WCDMA, may be an evolved Node B (eNB or e-NodeB) in LTE, or may be a network device (gNB) in a 5G system. In this embodiment of the present invention, the network device and the terminal device are not specifically limited.

It should be noted that the quantity of the terminal devices included in the communications system 100 shown in FIG. 1 is merely an example, and the embodiments of the present invention are not limited thereto. For example, the communications system 100 may further include more terminal devices communicating with the network device. For brevity, the terminal devices are not described one by one in the accompanying drawings. In addition, although the communications system 100 shown in FIG. 1 includes the network device 10 and the terminal device 20, the communications system 100 may not be limited to include the network device and the terminal device, for example, may further include a core network device or a device used to carry a virtualized network function. These are apparently known by a person of ordinary skill in the art and are not described in detail herein one by one.

As described above, transmissions in unlicensed spectrum such as spectrum used by Wi-Fi are subject to rules for accessing the channel that ensure coexistence among systems using unlicensed spectrum and to ensure efficient usage of the spectrum.

Such rules may be regulated, such as in Europe where the ETSI harmonized standard EN 301 893 V2.1.1 (2017-05) (5 GHz RLAN; Harmonised Standard covering the essential requirements of article 3.2 of Directive 2014/53/EU) defines adaptivity rules to ensure efficient usage of the spectrum and fair coexistence among the users of the spectrum.

It is widely acknowledged that LBT using clear channel assessment (CCA) with exponential random backoff (Cat4 LBT) is a fair channel access mechanism and should be used as widely as possible for all data transmissions in unlicensed spectrum for services that do not require stringent QoS.

Exception are however allowed, such as for the transmissions of critical control information. Such exception is allowed for short control signaling in standard ESTI EN 301893 V2.1.1 (2017-05), where a device can transmit without CCA (Cat1 LBT) for no more than 5% of the time.

Channel access schemes definitions from 3GPP TR 38.889 V0.2.0 (2018-10) (3rd Generation Partnership Project; Technical Specification Group Radio Access Network; Study on NR-based Access to Unlicensed Spectrum; (Release 16)):

Category 1: Immediate transmission after a short switching gap

This is used for a transmitter to immediately transmit after a switching gap inside a channel occupancy time (COT).

The switching gap from reception to transmission is to accommodate the transceiver turnaround time and is no longer than 16 μs.

Category 2: LBT without random back-off

The duration of time that the channel is sensed to be idle before the transmitting entity transmits is deterministic.

Category 3: LBT with random back-off with a contention window of fixed size

The LBT procedure has the following procedure as one of its components. The transmitting entity draws a random number N within a contention window. The size of the contention window is specified by the minimum and maximum value of N. The size of the contention window is fixed. The random number N is used in the LBT procedure to determine the duration of time that the channel is sensed to be idle before the transmitting entity transmits on the channel.

Category 4: LBT with random back-off with a contention window of variable size

The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel.

For Category 4 LBT, ETSI TS 137 213 V15.1.0 (2018-10) (LTE; Physical layer procedures for shared spectrum channel access) or 3GPP TS 37.213 version 15.1.0 Release 15, defines four channel access priority classes as follows:

TABLE 1

Channel Access Priority Class

| Channel Access Priority Class (p) | $m_p$ | $CW_{min,p}$ | $CW_{max,p}$ | $T_{mcot,p}$ | Allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

Similarly, ETSI EN 301 893 V2.1.1 (2017-05) defines four channel access priority classes as follows:

TABLE 2

Priority Class dependent Channel Access parameters for Supervising Devices

| Class # | $p_o$ | $CW_{min}$ | $CW_{max}$ | Maximum Channel Occupancy Time (COT) |
|---|---|---|---|---|
| 4 | 1 | 3 | 7 | 2 ms |
| 3 | 1 | 7 | 15 | 4 ms |
| 2 | 3 | 15 | 63 | 6 ms (see note 1 and note 2) |
| 1 | 7 | 15 | 1023 | 6 ms (see note 1) |

Note 1:
The maximum Channel Occupancy Time (COT) of 6 ms may be increased to 8 ms by inserting one or more pauses. The minimum duration of a pause shall be 100 μs. The maximum duration (Channel Occupancy) before including any such pause shall be 6 ms. Pause duration is not included in the channel occupancy time.
Note 2:
The maximum Channel Occupancy Time (COT) of 6 ms may be increased to 10 ms by extending CW to CW x 2 + 1 when selecting the random number q for any backoff(s) that precede the Channel Occupancy that may exceed 6 ms or which follow the Channel Occupancy that exceeded 6 ms. The choice between preceding or following a Channel Occupancy shall remain unchanged during the operation time of the device.
Note 3:
The values for $p_o$, $CW_{min}$, $CW_{max}$ are minimum values. Greater values are allowed.

LTE-LAA was designed based on LTE, and therefore inherited the synchronized nature of frame-based orthogonal frequency division multiple access (OFDMA) systems. This was beneficial for simplifying specification efforts but mostly for reusing protocols and hardware used in LTE devices, such as those used for radio resource measurement (RRM) where reference signals used for measurements are transmitted at periodic intervals. This type of transmission does not fit well with LBT Cat4 since exponential random backoff cannot ensure that attempts to access to the channel are synchronized with the periods where transmissions of reference signals are allowed. For this reason, LTE-LAA defined those measurements based on discovery reference signals (DRS) transmitted quasi-periodically using a single-shot LBT (Cat2 LBT). The transmission is allowed at candidate times within a periodic window called discovery signals measurement timing configuration (DMTC). In LTE-LAA, the single-shot LBT is performed by sensing two slots of 9 μs during an interval of 25 μs, as specified in section 4.1.2 of 3GPP TS 37.213 V15.1.0.

The transmission of DRS is necessary in networks that operate standalone in unlicensed spectrum, i.e. without the help of an anchor carrier in licensed spectrum (as in the case of LAA). For a standalone unlicensed network, the DRS not only carry reference signaling for synchronization and measurements of channel quality, but also carry critical control information such as network system information, without which devices cannot start operating on the network. The transmission of DRS for NR-U supports the scenario of standalone operation.

The transmission of DRS using Cat2 LBT by one LTE-LAA device is allowed under the European regulations allowing an exception for short control signaling transmissions. While the exception allows transmission of short control signaling without CCA (Cat1 LBT), LTE-LAA requires at least one 25 μs CCA and the channel must be sensed idle to allow the transmission of DRS. This allows transmitting the DRS when the channel is not already occupied by another signal, thus avoiding interference from and to other systems. It means, however, that the channel may not always be available at the intended time of transmission and thus a periodic DRS transmission is not guaranteed. In order to achieve a quasi-periodic transmission of DRS, which is preferable for example for other devices to re-adjust their synchronization, several opportunities are defined in a DRS window (also called a discovery signals measurement timing configuration (DMTC) window). Within a 5 ms window and an opportunity to sense the channel at every ms, the system effectively has 5 opportunities for attempting DRS transmission. The DMTC window occurs once every 20 ms, thus complying with the limitations set by regulations for the transmission of short control signaling.

It is understood that an exception remains acceptable under reasonable use of the exception. The exception is defined for one device. If many devices within the same communication area make use of the exception, this may result in inefficient use of the spectrum under certain conditions. If some devices make use of the exception in the presence of other devices not making use of the exception within the same communication area, this may result in unfair use of the spectrum and coexistence issues. Therefore, the main problem identified with the use of Cat2 LBT for the transmission of DRS occurs in the case of increased traffic loads, since Cat2 LBT is unable to adapt in a fair manner to the increased amount of contentions to access the channel.

On the other hand, using Cat4 LBT also for DRS would mean that in conditions of heavy data traffic there might be very few opportunities for sending DRS, resulting in users not being able to register with the network (due to lack of system information acquisition) or losing synchronization with the network. In both cases, those users are unable to operate properly.

Based on the above problem, the present invention defines the rules of a channel access mechanism for the transmission of a quasi-periodic signal of limited duration (e.g. a DRS) in a synchronized network, provides channel access method and apparatus for transmission of a signal in unlicensed spectrum, where the channel access mechanism adapts to the (data and control traffic) load in the channel using LBT with random back-off with a contention window of variable size (Cat4 LBT). The access to the channel within a periodic DMTC window is conditioned on the successful completion of a contention window counter before being allowed to attempt one or multiple discontinuous single-shot (Cat2) LBTs within the DMTC window before transmission.

It should be noted that the DRS and the DMTC window mentioned in the present invention are merely an example, and the embodiments of the present invention are not limited thereto.

Figure 2:
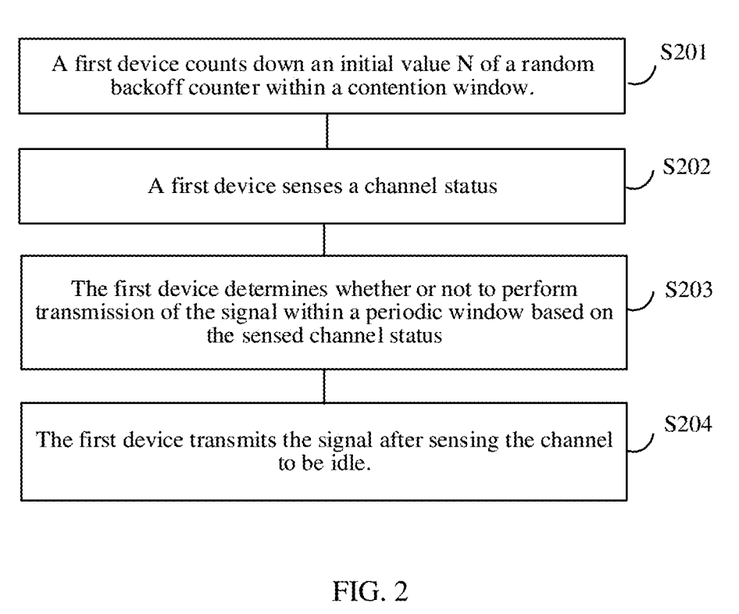
FIG. 2 is a schematic diagram of a channel access method for transmission signals according to an embodiment of the present invention.

FIG. 2 is a schematic diagram of a channel access method for transmission signals according to an embodiment of the present invention. The method provided in this embodiment is described below in detail with reference to FIG. 2.

S201: A first device counts down an initial value N of a random backoff counter within a contention window (CW).

The first device is assigned a contention window size (CWS) and the random backoff counter initialized at a value N depending on the CWS. Where N is a positive integer. The initial contention window size may depend on a priority class assigned to the first device.

S202: A first device senses a channel status.

A periodic window is configured between a first device and a second device. Wherein the first device is a transmitting device, and the second device is a receiving device. Optionally, when the first device is a network device, for example, base station, eNB, gNB, and so on; the second device is a terminal device, for example, UE, mobile terminal, and so on. Alternatively, when the first device is the terminal device, the second device is the network device.

Optionally, the periodic window is a DMTC window.

Discrete times $t_m$ ($t_0, t_1, \ldots, t_M$) are defined only within each DMTC window. Wherein $t_0$ corresponds to a first transmission occasion of the DMTC window, m and M are integer, and $0 \leq m \leq M$. Transmission of a signal from the first device is only allowed to start at those discrete times, depending on additional conditions for sensing energy (or other transmissions) in the channel. Optionally, the signal is a DRS.

The first device counts down the counter (starting at N) within the contention window by sensing the channel (e.g. by sensing received energy and comparing it to a threshold). The value of the counter can only be decreased by 1 if the first device senses the channel to be idle in a sensing time unit (for example a slot of duration 9 μs). The first device can choose when to sense the channel. Sensing slots may or may not be contiguous in time.

It should be noted that the slot mentioned in the present invention is merely an example of sensing time unit, and the embodiments of the present invention are not limited thereto.

If the initial value N of the random backoff counter reaches 0 just before a discrete time $t_m$ in a DMTC window, then the first device can transmit immediately at time $t_m$. After the end of the transmission (and possibly after waiting additional time $T_3$ without transmitting), the first device resets its CWS to the smallest size allowed by its priority class, and resets its counter before starting counting down again (example case H illustrated in FIG. 10).

If the initial value N of the random backoff counter reaches 0 at some time before the next discrete time $t_m$ in a DMTC window, then the first device waits and later attempts a first additional single-shot (Cat2) LBT in a first single interval just before discrete time $t_m$. The first single interval after the counter has reached 0 must have duration of at least $T_1$ (a first sensing time unit). Wherein the first sensing time unit occurs before a transmission occasion within the periodic window, and the periodic window contains multiple transmission occasions.

S203: The first device determines whether or not to perform transmission of the signal within a periodic window based on the sensed channel status.

Wherein the determining is performed one or multiple times in one or multiple sensing time units within one periodic window after the value of the counter has reached 0 and before the value of counter is re-initialized. In a possible design, the sensing time unit is a sensing slot.

S204: The first device transmits the signal after sensing the channel to be idle. Wherein transmitting the signal occurs within the periodic window after sensing the channel to be idle after the counter has reached 0.

Wherein the first device senses the channel status within the periodic window by using Cat2 LBT.

Optionally, the first device adjust the CWS after an end of the transmission or an end of the DMTC window.

In a possible design, if the channel is sensed idle during the first single interval of duration $T_1$ then the first device is allowed to transmit immediately.

Figure 3:
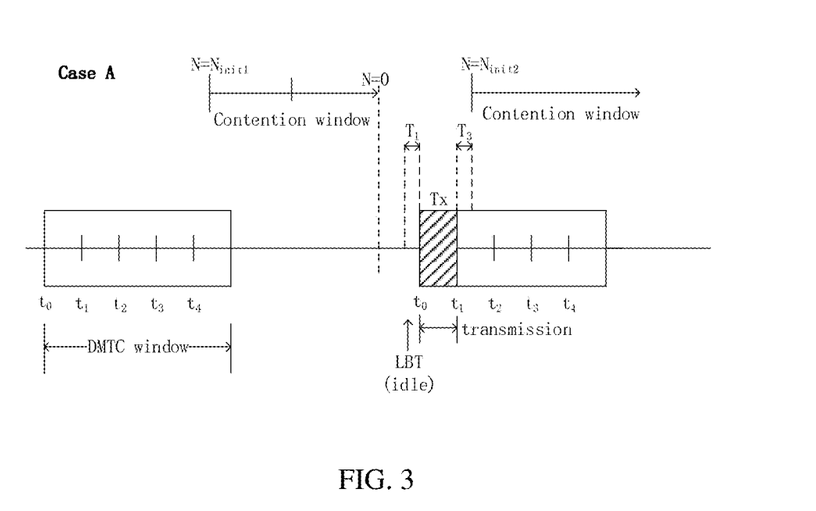
FIG. 3 shows a possible implementation of the channel access method for transmission signals according to an embodiment of the present invention.

Optionally, if the transmission started at time $t_0$ within a DMTC (i.e. $t_m = t_0$, corresponding to a first transmission occasion of the DMTC), then after the end of the transmission (and possibly after waiting additional time $T_3$ without transmitting), the first device resets its CWS to the smallest size and resets its counter before starting counting down again (example case A illustrated in FIG. 3)

Optionally, if the transmission started at a different time than $t_0$ (e.g. $t_1$ or $t_2$ or $t_M$), then after the end of the transmission (and possibly after waiting additional time $T_3$ without transmitting):

In a possible design, (example case F illustrated in FIG. 8): the first device must double its CWS (or keep the same CWS if it is already the largest) and reset its counter before starting counting down again. This design may be enforced if the counter reached 0 earlier than $T_1$ before the start of the next DMTC window. In this case, the first device is punished for not having attempted to sense the channel at the first available opportunity allowing transmission at the start ($t_0$) of the DMTC.

In another possible design, (example case E illustrated in FIG. 9): the first device resets its CWS to the smallest size and resets its counter before starting counting down again. This design may be enforced if the counter reached 0 later than $T_1$ before the start of the next DMTC window. This design would be consistent with a conventional Cat4 LBT principle, and there is no reason to punish the first device since it was the first attempt to sense the channel after the counter reached 0.

Alternatively, if the channel is sensed occupied during the first sensing interval of duration $T_1$ then the first device is allowed to attempt single-shot (Cat2) LBT in additional sensing intervals of duration $T_2$ (a second sensing time unit, $T_2$ is typically smaller than $T_1$) at every discrete time ($t_1, \ldots, t_M$) until the end of the same DMTC window, and the first device is allowed to transmit only once within the DMTC window when the channel is sensed idle in one of the additional sensing intervals of duration $T_2$. Wherein the periodic window contains multiple transmission occasions, and the first sensing time unit and the second sensing time units occurs before a transmission occasion within the periodic window. Whether the first device has successfully transmitted (examples case B illustrated in FIG. 4 and case C illustrated in FIG. 5) or not (example case D illustrated in FIG. 6) by the end of the DMTC window, the first device must increase (e.g. double) its CWS (or keep the same CWS if it is already the largest) and reset its counter before starting counting down again.

The second device attempts to blindly detect transmissions of the first device within DMTC windows at times $t_0, t_1, \ldots, t_M$.

An example of $T_1$ is $T_{sl}+T_d$ in LTE-LAA, where $T_{sl}=9$ µs and $T_d=T_f+m_p\times T_{sl}$, where $T_f=T_{sl}+7$ µs, where each instance of $T_{sl}$ corresponds to the duration of a slot, and $m_p$ is an integer. The minimum value of $T_1$ allowed for LTE-LAA is 34 µs ($m_p=3$). An example of $T_2$ is $T_{drs}=T_f+T_{sl}=25$ µs in LTE-LAA.

Where $T_{sl}$ is the 9 µs slot duration, $T_f$ is the 16 µs slot duration, $T_d$ is the defer duration, $m_p$ is the number of 9 µs slots, and $T_{drs}$ is the duration of the DRS signal.

To describe the technical solutions in the embodiments of the present invention more clearly, the following introduces the cases for describing the embodiments in detail.

FIG. 3 shows a possible implementation of the channel access method for transmission signals according to an embodiment of the present invention. In case A illustrated in FIG. 3, the first device has finished counting down before the start of the next DMTC window, and has sensed the channel idle for one additional sensing interval $T_1$ just before the first discrete interval $t_0$, then starts transmitting at $t_0$. The contention window before counter reached 0 had been initialized at 7, and since the counter reached 0 before the DMTC window and transmission was successful within the DMTC window, the first device is allowed to reset its CWS to the minimum value (assumed to be 3) for its priority class. In this example, the first device starts counting down again after waiting for a time $T_3$ after the end of its transmission.

Figure 4:
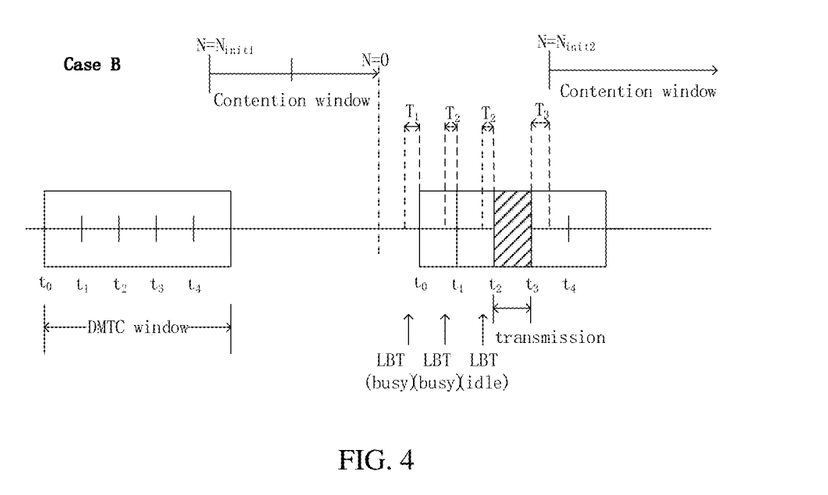
FIG. 4 shows another possible implementation of the channel access method for transmission signals according to an embodiment of the present invention.

FIG. 4 shows another possible implementation of the channel access method for transmission signals according to an embodiment of the present invention. In case B illustrated in FIG. 4, the first device has finished counting down before the start of the next DMTC window, but the channel was sensed busy during the first additional sensing interval $T_1$. The first device then attempted a second and a third sensing intervals of duration $T_2$. The first device sensed the channel idle during the third interval and started transmitting at $t_2$. Because the channel was not sensed idle during $T_1$, the device needs to double its CWS before starting counting down again.

Figure 5:
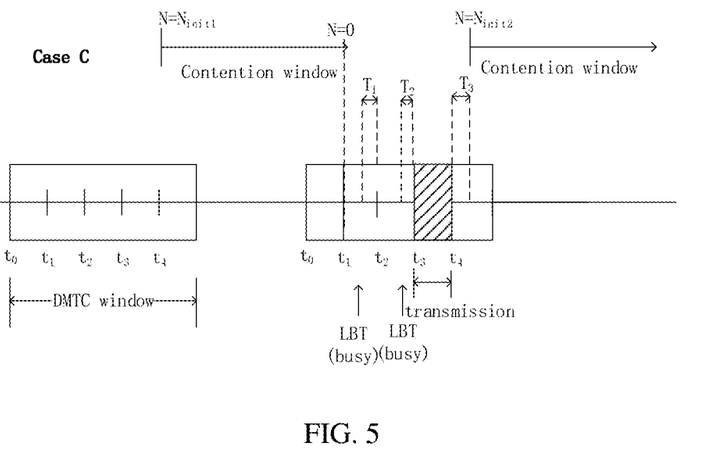
FIG. 5 shows another possible implementation of the channel access method for transmission signals according to an embodiment of the present invention.

FIG. 5 shows another possible implementation of the channel access method for transmission signals according to an embodiment of the present invention. In case C illustrated in FIG. 5, the first device did not finish counting down before the start of the next DMTC window, but finished counting down during the DMTC window. The channel was sensed busy during the first additional sensing interval $T_1$. The first device then attempted a second interval of duration $T_2$. Wherein the first device perform Cat4 LBT until the value of the counter reaches 0. After the value of the counter reaches 0, the first device perform Cat2 LBT. The first device sensed the channel idle during the second interval and started transmitting at $t_3$. Because the channel was not sensed idle during $T_1$, the device needs to double its CWS before starting counting down again.

Figure 6:
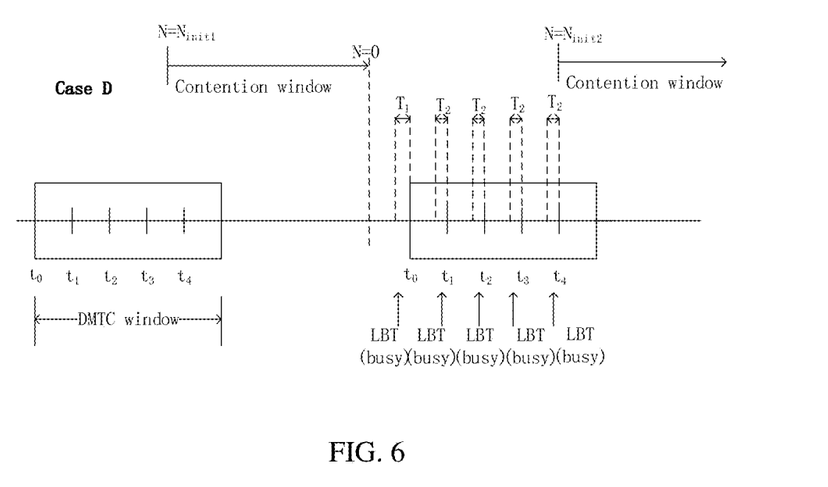
FIG. 6 shows another possible implementation of the channel access method for transmission signals according to an embodiment of the present invention.

FIG. 6 shows another possible implementation of the channel access method for transmission signals according to an embodiment of the present invention. In case D illustrated in FIG. 6, the first device has finished counting down before the start of the next DMTC window, but the channel was sensed busy during the first additional sensing interval $T_1$. The first device then attempted additional sensing intervals of duration $T_2$ during the DMTC window, but the channel was sensed busy in all these additional sensing intervals. Therefore, the first device is unable to transmit during the DMRS window. Because the channel was not sensed idle during $T_1$, the device needs to double its CWS before starting counting down again. This case is to be compared with Case A and Case B.

Figure 7:
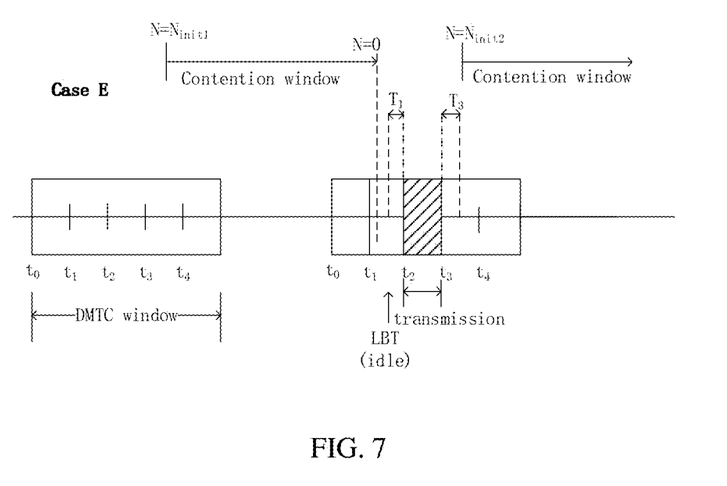
FIG. 7 shows another possible implementation of the channel access method for transmission signals according to an embodiment of the present invention.

FIG. 7 shows another possible implementation of the channel access method for transmission signals according to an embodiment of the present invention. In case E illustrated in FIG. 7, the first device did not finish counting down before the start of the next DMTC window, but finished counting down during the DMTC window. The channel was sensed idle during the first additional sensing interval $T_1$. The first device then started transmitting at $t_2$. Because the channel was sensed idle during $T_1$, the device is allowed to reset its CWS to the minimum value (assumed to be 3) for its priority class before starting counting down again. This case is to be compared with Case C.

Figure 8:
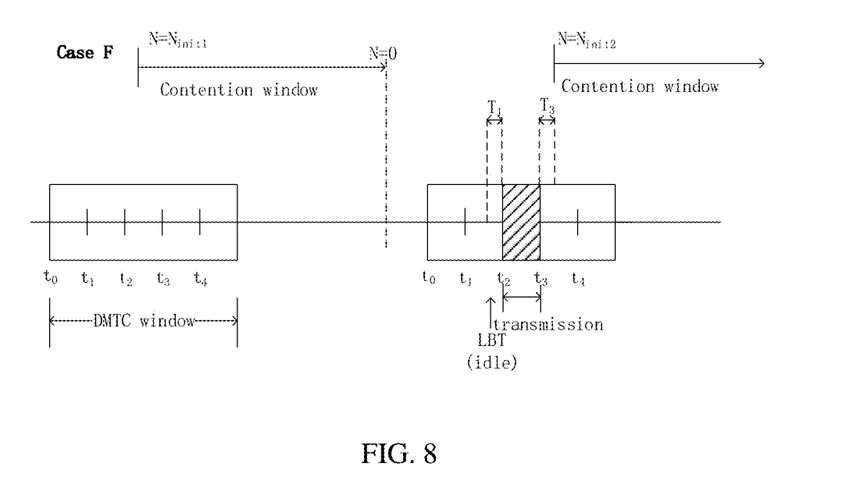
FIG. 8 shows another possible implementation of the channel access method for transmission signals according to an embodiment of the present invention.

FIG. 8 shows another possible implementation of the channel access method for transmission signals according to an embodiment of the present invention. In case F illustrated in FIG. 8, the first device has finished counting down before the start of the next DMTC window, but the first device did not attempt sensing using additional intervals before $t_0$ and $t_1$. The first device then attempted a first additional sensing intervals of duration $T_1$ before $t_2$. The first device sensed the channel idle during this first additional interval and started transmitting at $t_2$. The channel was sensed idle during the first additional sensing interval of duration $T_1$ ($T_1$ is typically greater than $T_2$), so the device should have been allowed to reset it CWS to its smallest value before starting counting down again (as in case E). However, in comparison with case B, the device has deferred its attempt to contend for the channel. While this behavior should be allowed, an observer may not be able to determine whether the first device has attempted sensing before $t_0$ and $t_1$. If no other device had been transmitting at times $t_0$ and $t_1$, the observer could determine that the first device did not attempt sensing at those times. But if another device had been transmitting at times $t_0$ and $t_1$, the observer could not determine that the first device did not attempt sensing at those times. So to be consistent with Case B, the rule could enforce that the contention window shall be increased unless the transmission was successful at $t_0$ (using a first additional sensing interval $T_1>T_2$).

Figure 9:
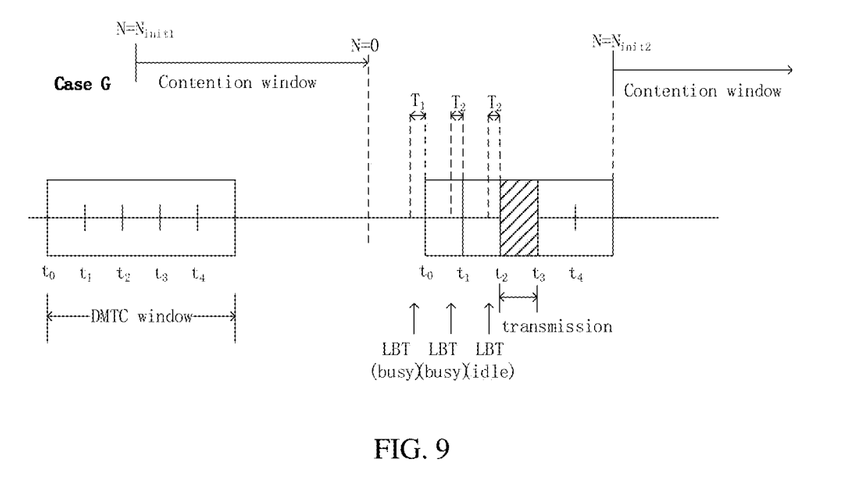
FIG. 9 shows another possible implementation of the channel access method for transmission signals according to an embodiment of the present invention.

FIG. 9 shows another possible implementation of the channel access method for transmission signals according to an embodiment of the present invention. In case G illustrated in FIG. 9, the first device has finished counting down before the start of the next DMTC window, but the channel was sensed busy during the first additional sensing interval $T_1$. The first device then attempted a second and a third sensing intervals of duration $T_2$. The first device sensed the channel idle during the third interval and started transmitting at $t_2$. Because the channel was not sensed idle during $T_1$, the device needs to double its CWS before starting counting down again. In this case, the device is only allowed to start counting down again after the end of the DMTC window. This case is to be compared with Case B. The intent for deferring the new count-down is to avoid that devices start counting down during the DMTC window in which the device is allowed to contend for the channel using a short Cat2 LBT, as a fairness measure in comparison to devices that never use Cat2 LBT but only Cat4 LBT for all transmissions. Case G can be viewed as setting interval $T_3$ relative to the end of the DMTC window, rather than a fixed value.

Figure 10:
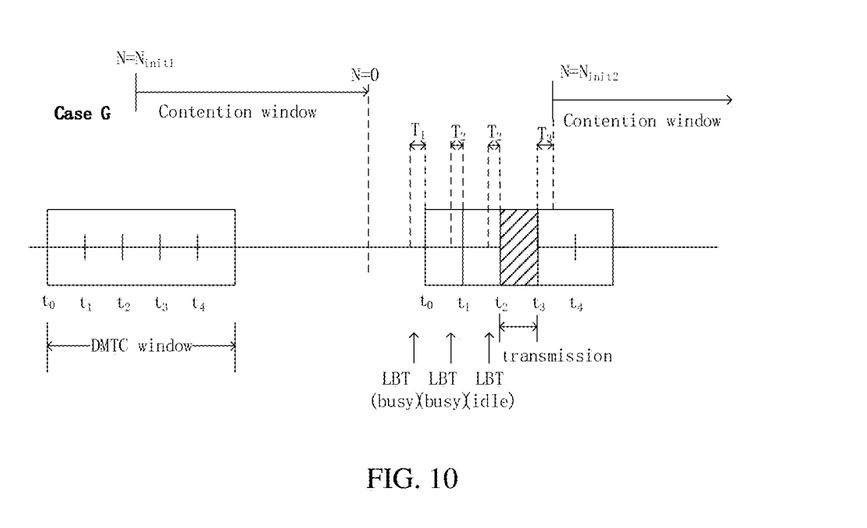
FIG. 10 shows another possible implementation of the channel access method for transmission signals according to an embodiment of the present invention.

FIG. 10 shows another possible implementation of case G compared to FIG. 9. Different from the FIG. 9, the device is allowed to start counting down again after the end of the transmission (and possibly after waiting interval $T_3$ without transmission, as illustrated in FIG. 10, the first device is allowed to start counting down again at $(t_3+T_3)$). If no interval $T_3$, the interval $T_3$ can be deemed to 0.

Figure 11:
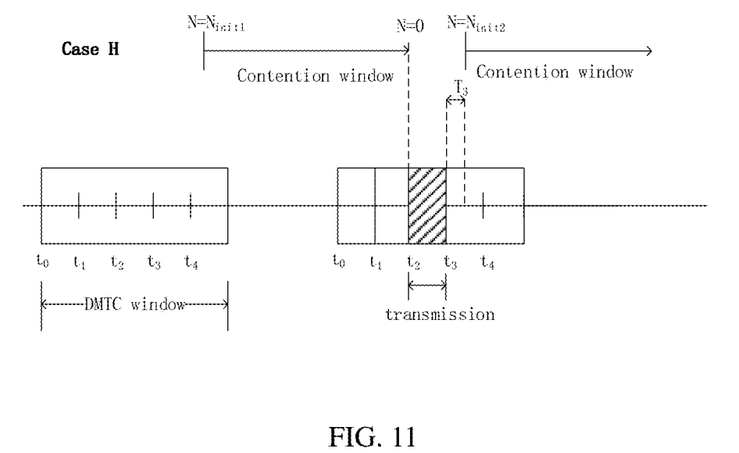
FIG. 11 shows another possible implementation of the channel access method for transmission signals according to an embodiment of the present invention.

FIG. 11 shows another possible implementation of the channel access method for transmission signals according to an embodiment of the present invention. In case H illustrated in FIG. 11, the first device did not finish counting down before the start of the next DMTC window, but finished counting down during the DMTC window just before time $t_2$. In this case there is no need for the first device to sense for an additional sensing interval, and the first device can start transmitting immediately at time $t_2$. Because the channel was occupied by the first device right after its counter reached 0, the first device is allowed to reset its CWS to the minimum value (assumed to be 3) for its priority class. This case is to be compared with Case C.

It should be noted that in cases A to C, E to H, the first device is allowed to start counting down again after an end of the transmission or after an end of the periodic window, and the embodiments of the present invention are not limited thereto.

It should be noted that $T_3$ in all cases of the present invention can be 0.

The embodiment of the present invention provides the method of a channel access for the transmission of a quasi-periodic signal of limited duration (e.g. a DRS) in a synchronized network, where the channel access method adapts to the (data and control traffic) load in the channel using LBT with random back-off with a contention window of variable size (Cat4 LBT). The access to the channel within a periodic DMTC window is conditioned on the successful completion of a contention window counter before being allowed to attempt one or multiple discontinuous single-shot LBTs within the DMTC window before transmission.

Compared to a LTE-LAA device, a device operating according to the present invention will not be able to always attempt transmitting with a single-shot LBT at the start of and within a DMTC window, thus the device will compete more fairly with other devices performing LBT with random exponential backoff.

Compared to a network with many LTE-LAA devices, a network with many devices operating according to the present invention will not experience consistent blocking of DRS transmissions from certain devices by other devices, since times to attempt accessing the channel will be randomized by exponential backoff.

Compared to a device using only Cat4 LBT for the transmission of DRS, a device operating according to the present invention will be able to access the channel within a DMTC with higher probability.

It should be noted that the first device may use the above steps for the transmission of reference signals (DRS) or other similar signals/channels (e.g. PRACH) of short finite duration (e.g. no longer than 1 ms), and may additional use another channel access mechanism for initiating transmission of data or control to other devices. The embodiments of the present invention are not limited thereto.

The foregoing mainly describes the channel access method in the embodiments of the present invention from the perspective of interaction between network elements. It may be understood that, to implement the foregoing functions, the network elements, such as the network device and the terminal device, include a corresponding hardware structure and/or software module for performing each of the functions. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 12:
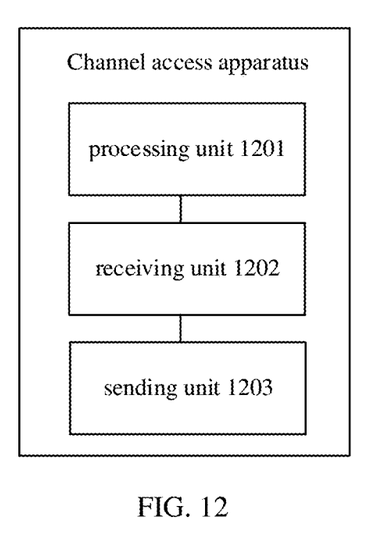
FIG. 12 is a possible schematic structural diagram of a channel access apparatus for transmission signals according to an embodiment of the present invention.

FIG. 12 is a possible schematic structural diagram of a channel access apparatus for transmission signals according to an embodiment of the present invention. It should be noted that the apparatus can perform the method in the foregoing embodiment. The apparatus may be the terminal device 20 shown in FIG. 1, and also may be the network device 10 shown in FIG. 1. The apparatus includes a processing unit 1201, a receiving unit 1202 and a sending unit 1203.

The processing unit 1201 is configured to count down an initial value N of a random backoff counter within a contention window.

The receiving unit 1202 is configured to sense a channel status.

The processing unit 1101 is further configured to determine whether or not to perform transmission of the signal within a periodic window based on the sensed channel status.

The sending unit 1203 is configured to transmit the signal after sensing the channel to be idle. Wherein a value of the counter is decreased by 1 when the channel is sensed to be idle in one sensing slot; wherein the processing unit is performed one or multiple times in one or multiple sensing time units within one periodic window after the value of the counter has reached 0 and before the value of counter is re-initialized; wherein transmitting the signal occurs within the periodic window after sensing the channel to be idle after the counter has reached 0.

Optionally, when the channel is sensed idle during a first sensing time unit, the sending unit 1103 performs the transmission of the signal. Wherein the first sensing time unit occurs before a transmission occasion within the periodic window, and the periodic window contains multiple transmission occasions.

Optionally, when the sending unit performs the transmission at a transmission occasion within the periodic window, the processing unit further configured to adjust a contention window size (CWS) to the smallest size after an end of the transmission. Optionally, the adjusting the CWS comprises: adjusting the CWS to the smallest size; doubling the CWS; or keeping the CWS when the CWS is the largest.

Optionally, when the channel is sensed occupied during a first sensing time unit, the processing unit configured to sense the channel during a second sensing time unit, wherein the second sensing time unit are within the periodic window.

As described in S204 in the embodiment shown in FIG. 2, the second sensing time unit ($T_2$) is smaller than the first sensing time unit ($T_1$).

In a possible design, when the channel is sensed occupied in every sensing time unit used for determining whether or not to perform transmission of the signal within the periodic window, the sending unit 1203 does not transmit the signal during the periodic window and the processing unit 1201 further configured to increase a contention window size (CWS) before the value of counter is re-initialized.

Optionally, the processing unit further configured to adjust a contention window size (CWS) after an end of the transmission or an end of the periodic window. wherein the adjusting the CWS comprises: increasing the CWS; or keeping the CWS when the CWS is the largest.

In a possible design, when the channel is sensed idle during the second sensing time unit after the counter has reached 0, the sending unit performs the transmission of the signal; wherein the first sensing time unit and the second sensing time units occurs before a transmission occasion within the periodic window, and the periodic window contains multiple transmission occasions.

Optionally, when the value N of the counter reaches 0 before a first time within the periodic window, the processing unit configured to perform the transmission at the first time, and adjust a contention window size (CWS) to the smallest size after an end of the transmission.

As described in S201-S204 in the embodiment shown in FIG. 2, wherein the signal is a discovery reference signal (DRS).

As described in S201-S204 in the embodiment shown in FIG. 2, wherein the periodic window is discovery signals measurement timing configuration (DMTC) window.

Other implementable effects of the units that are not described are the same as related effects of the channel access method shown in FIG. 2 to FIG. 11, and details are not described herein again one by one.

The embodiment of the present invention provides the apparatus of a channel access for the transmission of a quasi-periodic signal of limited duration (e.g. a DRS) in a synchronized network, where the channel access apparatus adapts to the (data and control traffic) load in the channel using LBT with random back-off with a contention window of variable size (Cat4 LBT). The access to the channel within a periodic DMTC window is conditioned on the successful completion of a contention window counter before being allowed to attempt one or multiple discontinuous single-shot LBTs within the DMTC window before transmission.

Compared to a LTE-LAA device, a device operating according to the present invention will not be able to always attempt transmitting with a single-shot LBT at the start of and within a DMTC window, thus the device will compete more fairly with other devices performing LBT with random exponential backoff.

Compared to a network with many LTE-LAA devices, a network with many devices operating according to the present invention will not experience consistent blocking of DRS transmissions from certain devices by other devices, since times to attempt accessing the channel will be randomized by exponential backoff.

Compared to a device using only Cat4 LBT for the transmission of DRS, a device operating according to the present invention will be able to access the channel within a DMTC with higher probability.

Figure 13:
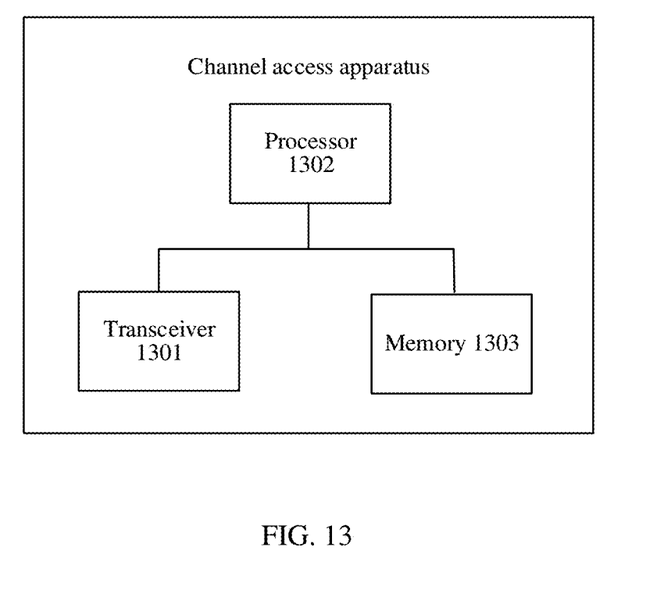
FIG. 13 is another possible schematic structural diagram of a channel access apparatus for transmission signals according to an embodiment of the present invention.

FIG. 13 is a possible schematic structural diagram of the channel access apparatus in the foregoing embodiments. The channel access apparatus includes a transceiver 1301 and a processor 1302. The processing unit 1201 described in FIG. 12 may be implemented by the processor 1302, the receiving unit 1202 and the sending unit 1203 may be implemented by the transceiver 1301, and the transceiver 1301 may be configured to support data transmission between the terminal device and the network device in the foregoing embodiment. The apparatus may further include a memory 1303 that may be configured to store program code and data of the apparatus. The components of the apparatus are coupled, and are configured to support the functions of the apparatus in the channel access method described in FIG. 2 to FIG. 11.

It may be understood that FIG. 13 shows only a simplified design of the apparatus. In an actual application, the apparatus may include any quantity of transceivers, processors, and memories, or the like, and all apparatus that can implement the present invention fall within the protection scope of the present invention.

It may be understood that the processor in the embodiments of the present invention may be a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The processor may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor.

Steps of the methods or algorithms described in the embodiments of the present invention may be directly embedded into hardware, a software module executed by a processing unit, or a combination thereof. The software module may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processing unit so that the processing unit may read information from the storage medium and write information to the storage medium. Alternatively, the storage medium may further be integrated into a processing unit. The processing unit and the storage medium may be arranged in an ASIC, and the ASIC may be arranged in a user terminal device. Optionally, the processing unit and the storage medium may be arranged in different components of the user terminal device.

A person skilled in the art should be aware that in the foregoing one or more examples, functions described in the embodiments of the present invention may be implemented by hardware, software, firmware, or any combination thereof. If implemented in the software, the functions may be stored on a computer-readable medium, or may be transmitted on the computer-readable medium in a form of one or more instructions or code. The computer-readable medium includes a computer storage medium and a communication medium enabling the computer program to transfer from one place to another place. The storage medium may be an available medium that may be accessed by any general or special computer. For example, the computer-readable medium may include but is not limited to a RAM, a ROM, an EEPROM, a CD-ROM or another optical disc storage, a magnetic disk storage or another magnetic storage apparatus, or any other medium that may be configured to carry or store program code in a form of an instruction or a data structure and another form that can be read by a general-purpose/particular computer or a general-purpose/particular processing unit. In addition, any connection may be appropriately defined as a computer-readable medium. For example, if software is transmitted from a website, a server, or another remote resource by using a coaxial cable, an optical fiber, a twisted pair, a digital subscriber line (DSL) or in a wireless manner, such as infrared, radio, or microwave, the software is included in a defined computer-readable medium. The disc (disk) and the disk (disc) include a compressed disk, a laser disk, an optical disc, a DVD, a floppy disk, and a Blu-ray disc. The disk generally copies data by a magnetic means, and the disc generally copies data optically by a laser means. The foregoing combination may also be included in the computer-readable medium.

The foregoing specific implementations further describe the objective, the technical solutions, and the beneficial effects of the embodiments of the present invention in detail. It should be understood that the foregoing is only specific implementations of the embodiments of the present invention, and is not intended to limit the protection scope of the embodiments of the present invention.

What is claimed is:

1. A method, comprising:
   determining, by a first device, an initial value of a random backoff counter within a contention window;
   sensing, by the first device, a channel status of a channel one or more times, to determine one or more channel sensing results, wherein a value of the random backoff counter is decreased by 1 each time the channel is sensed to be idle in one sensing slot;
   determining, by the first device, whether or not to perform transmission of a signal within a periodic window based on the one or more channel sensing results, wherein the determining is performed one or multiple times in one or multiple sensing time units within the periodic window after the value of the counter has reached 0 and before the value of counter is re-initialized; and
   transmitting, by the first device, the signal within the periodic window after sensing the channel to be idle after the counter has reached 0,
   wherein sensing, by the first device, the channel status one or more times, to determine the one or more channel sensing results, comprises:
      when the channel is sensed to be occupied during a first sensing time unit, sensing the channel during a second sensing time unit, wherein the second sensing time unit is within the periodic window and the second sensing time unit is smaller than the first sensing time unit.

2. The method according to claim 1, wherein determining, by the first device, whether or not to perform the transmission of the signal within the periodic window based on the one or more channel sensing results comprises:
   when the channel is sensed idle during a first sensing time unit after the counter has reached 0, determining, by the first device, to perform the transmission of the signal within the periodic window;
   wherein the first sensing time unit occurs before a transmission occasion within the periodic window, and the periodic window contains multiple transmission occasions.

3. The method according to claim 2, wherein when the first device performs the transmission at the transmission occasion within the periodic window, the first device adjusts a contention window size (CWS) after an end of the transmission or after an end of the periodic window; and
   wherein adjusting the CWS comprises:
      adjusting the CWS to a smallest size;
      doubling the CWS; or
      keeping the CWS when the CWS is a largest size.

4. The method according to claim 1, wherein when the channel is sensed occupied in every sensing time unit corresponding to the one or more channel sensing results, the first device does not transmit the signal during the periodic window and the first device increases a contention window size (CWS) before the value of counter is re-initialized; and
   wherein adjusting the CWS comprises:
      increasing the CWS; or
      keeping the CWS when the CWS is a largest size.

5. The method according to claim 1, wherein:
   when the channel is sensed to be idle during the second sensing time unit after the counter has reached 0, the first device performs the transmission of the signal in the periodic window; and
   the first sensing time unit and the second sensing time unit occur before a transmission occasion within the periodic window, and the periodic window contains multiple transmission occasions.

6. The method according to claim 1, wherein the signal is a discovery reference signal (DRS).

7. The method according to claim 1, wherein the periodic window is a discovery signals measurement timing configuration (DMTC) window.

8. The method according to claim 1, wherein the first device is a network device or a terminal device.

9. An apparatus, comprising:
   one or more processors; and
   one or more non-transitory memories, wherein the one or more non-transitory memories store a computer program for execution by the one or more processors, the computer program including instructions for operations comprising:
      determining an initial value of a random backoff counter within a contention window;
      sensing a channel status of a channel one or more times, to determine one or more channel sensing results, wherein a value of the random backoff counter is decreased by 1 each time the channel is sensed to be idle in one sensing slot;
      determining whether or not to perform transmission of a signal within a periodic window based on the one or more channel sensing results, wherein the determining is performed one or multiple times in one or multiple sensing time units within the periodic window after the value of the counter has reached 0 and before the value of counter is re-initialized;
      transmitting the signal after sensing the channel to be idle, wherein transmitting the signal occurs within the periodic window after sensing the channel to be idle after the counter has reached 0,
      wherein sensing the channel status one or more times, to determine the one or more channel sensing results, comprises:
         when the channel is sensed to be occupied during a first sensing time unit, sensing the channel during a second sensing time unit, wherein the second sensing time unit is within the periodic window and the second sensing time unit is smaller than the first sensing time unit.

10. The apparatus according to claim 9, wherein determining whether or not to perform transmission of the signal within the periodic window based on the one or more channel sensing results
   when the channel is sensed to be idle during a first sensing time unit, determining to perform the transmission of the signal, wherein the first sensing time unit occurs before a transmission occasion within the periodic window, and the periodic window contains multiple transmission occasions.

11. The apparatus according claim 10, wherein the computer program further includes instructions for operations comprising:
when performing the transmission at the transmission occasion within the periodic window, adjusting a contention window size (CWS) after an end of the transmission or after an end of the periodic window, wherein the adjusting the CWS comprises:
adjusting the CWS to a smallest size;
doubling the CWS; or
keeping the CWS when the CWS is a largest size.

12. The apparatus according to claim 9, wherein the computer program includes instructions for operations comprising:
when the channel is sensed to be occupied in every sensing time unit corresponding to the one or more channel sensing results, the signal is not transmitted during the periodic window and a contention window size (CWS) is adjusted before the value of counter is re-initialized;
wherein adjusting the CWS comprises:
increasing the CWS; or
keeping the CWS when the CWS is a largest size.

13. The apparatus according to claim 9, wherein the computer program includes instructions for operations comprising:
when the channel is sensed to be idle during the second sensing time unit after the counter has reached 0, performing the transmission of the signal;
wherein the first sensing time unit and the second sensing time unit occur before a transmission occasion within the periodic window, and the periodic window contains multiple transmission occasions.

14. The apparatus according to claim 9, wherein the signal is a discovery reference signal (DRS).

15. The apparatus according to claim 9, wherein the periodic window is a discovery signals measurement timing configuration (DMTC) window.

16. The apparatus according to claim 9, wherein the apparatus is a network device or a terminal device.

17. A non-transitory memory storing a computer program for execution by one or more processors, the computer program including instructions for operations comprising:
determining an initial value of a random backoff counter within a contention window; and
sensing a channel status of a channel one or more times, to determine one or more channel sensing results, wherein a value of the random backoff counter is decreased by 1 each time the channel is sensed to be idle in one sensing slot;
determining whether or not to perform transmission of a signal within a periodic window based on the one or more channel sensing results, wherein the determining is performed one or multiple times in one or multiple sensing time units within the periodic window after the value of the counter has reached 0 and before the value of counter is re-initialized,
wherein sensing the channel status one or more times, to determine the one or more channel sensing results, comprises:
when the channel is sensed to be occupied during a first sensing time unit, sensing the channel during a second sensing time unit, wherein the second sensing time unit is within the periodic window and the second sensing time unit is smaller than the first sensing time unit.

18. The non-transitory memory according to claim 17, wherein the signal is a discovery reference signal (DRS).

19. The non-transitory memory according to claim 17, wherein the periodic window is a discovery signals measurement timing configuration (DMTC) window.

* * * * *